United States Patent [19]

Dreyer et al.

[11] Patent Number: 4,462,612
[45] Date of Patent: Jul. 31, 1984

[54] TRAILER TELESCOPIC SUPPORTING LEG WITH DETACHABLE FOOT

[75] Inventors: Hans Dreyer, Egelsbach-Bayerseich; Gerald Müller, Rodgau, both of Fed. Rep. of Germany

[73] Assignee: Jost-Werke GmbH, Neu Isenburg, Fed. Rep. of Germany

[21] Appl. No.: 377,379

[22] Filed: May 12, 1982

[30] Foreign Application Priority Data

May 15, 1981 [DE] Fed. Rep. of Germany ....... 3119359

[51] Int. Cl.$^3$ .............................................. B60S 9/02
[52] U.S. Cl. .................. 280/766.1; 212/189; 248/352; 248/616
[58] Field of Search .............. 280/763.1, 764.1, 765.1, 280/766.1, 490 R, 475; 248/352, 616, 188.8, 188.9; 254/419, 420; 212/189

[56]  References Cited

U.S. PATENT DOCUMENTS

| 3,020,063 | 2/1962 | Warren | 280/763.1 |
| 3,536,337 | 10/1970 | Molnar | 280/764.1 |
| 3,666,290 | 5/1972 | Dalton | 280/763.1 |
| 3,871,685 | 3/1975 | Senelet | 280/766.1 |

Primary Examiner—Joseph F. Peters, Jr.
Assistant Examiner—Joseph G. McCarthy
Attorney, Agent, or Firm—Barlow & Barlow, Ltd.

[57] ABSTRACT

A telescopic supporting device for heavy loads of trailers is disclosed which device has a supporting leg projecting from a guiding tube and on the lower end of the supporting leg there is detachably fastened an articulated foot. The foot features a supporting plate which has fastened thereto a holding ring. The lower terminal section of the supporting leg has a ground plate that overlaps the lower edge to laterally jut out. A coupling articulately connects the holding ring with the supporting leg, the coupling being provided with a bolt system traversing diametral circular holes. An elastic compression body is placed between the ground plate and a supporting plate. The upper terminal section of the holding ring overlaps the laterally jutting-out edge section of the ground plate. The supporting leg and the ground plate are separated. To the ground plate there is fastened a supporting tubular sleeve, that fits within the leg. The bolt system transverses diametral circular holes in the supporting sleeve wall and the bolt system is countersunk in circular holes in the supporting leg wall.

1 Claim, 3 Drawing Figures

TRAILER TELESCOPIC SUPPORTING LEG WITH DETACHABLE FOOT

The present invention relates to a trailer landing gear and more particularly to a telescopic support for heavy loads at the end of the trailer opposite the road wheels. The support has an extensible leg that may be propelled from a guiding tube. On the lower end of the leg, there is fastened an articulate foot which remains detachable. The foot features a tubular sleeve fastened to a ground plate and coupled to the lower terminal section of the leg, the plate jutting out sidewise with an edge section lying over the lower edge of the leg. A holding ring extends over the edge section and is secured to the supporting plate so that the supporting plate is articulated relative to the leg. An elastic compression body is placed between the ground plate and the supporting plate to absorb shocks, while the tubular sleeve is coupled to the leg by a bolt system received in diametral holes in the leg and sleeve, the heads of the bolts being recessed in the wall of the leg.

Telescopic landing gear are known, as seen by U.S. Pat. No. 3,366,290, FIG. 6 where the bolt system is a bolt with an external polygonal head traversing the lower end of the supporting leg and the holding ring. The bolt head and the nut on the bolt end project laterally over the outer side of the holding ring. The holding ring and the laterally projecting ends of the bolt prevent the leg from being fully retracted and the bolt to be covered by the guiding tube. The free ends of the bolt can therefore, even when the leg is retracted, become soiled or corroded, so that the bolt and the nut cannot be separated and the supporting foot cannot easily be replaced. Therefore, since the lower terminal section of the leg, even in the retracted state, protrudes noticeably from the guiding tube, there results a noticeably larger constructive height of the supporting device with respect to a given stroke length, and the lower terminal section of the supporting tube in its retracted state is not reinforced against buckling by the guiding tube.

In the aforementioned prior art, the bolt traverses the vertical holes in the holding ring, which ensures swinging motion about a horizontal axis which is normal to the longitudinal axis of the bolt and, at the same time, limits the vertical springing action of the foot while permitting the penetration of dirt and moisture in the foot. The bolt under a high load condition may shear, and the springlike suspension of the foot is limited in a corresponding manner. The existing shearing stress demands a particular tough bolt, while the small springing action makes difficult the adaptability of the foot to ground unevennesses.

There is also from FIG. 2 of U.S. Pat. No. 3,666,290, or German published specification No. 25 00 991 a structure that allows the upper axial edge section of the holding ring to overlap the jutting-out ring section of the ground plate that is welded on to the lower end of the supporting tube. The swinging mobility of the foot in all directions is attained in a simple manner, but replacement in case of a failure of the bracket 28 of the elastic compression body is restricted.

The invention has been inspired by the idea to create a supporting device of an appropriate kind, in which there exists the possibility of a larger stroke length with respect to the constructive length and of a larger swinging angle for the foot, both with simple means while still having large load capacity and longevity.

According to the invention, this task has been solved by the following means: an upper edge section of the holding ring overlaps the edge section of a ground plate that extends radially outward of the leg; the supporting leg and the ground plate are separated; to the ground plate there is fastened a tubular sleeve introduced in the supporting leg; the bolt system transverses the diametral circular holes of the support leg wall; the diameter of these circular holes is smaller than the diameter of the circular holes in the supporting leg wall and the bolt system is countersunk in the circular holes in the supporting leg wall.

In this construction, the supporting leg can be retracted so that the guiding tube covers the bolt system. The stroke length is therefore, with respect to the typical supporting device, longer by the length of the overlap of the guiding tube and with the same constructive length; the overlapping in such case takes care of the reinforcement of the supporting tube and holds the dirt and dampness away from the bolt system and prevents the penetration at the foot through holes of the supporting tube and the tubular sleeve, and serves as insurance against the loss of the bolt system. The bolt system is completely free from the load forces, in such a manner that it can be designed with thinner parts. Nevertheless, the foot can be easily dismantled by means of the loosening of the bolt system. The swinging angle and the resilience of the foot is however limited only by the compressibility of the elastic body and the distance between the holding ring and the supporting leg, so that the foot can be adapted for the more important unevennesses of the ground.

Preferably one tends to provide the bolt systems featuring two cap screws, which may be screwed-in formed threads in the tubular sleeve. Thereby there can be used simple bolts or screws, which need no special manufacturing. Also, the threaded parts can be formed by nuts and each nut can be welded on the inner side of the supporting sleeve coaxially with the circular holes. In this manner it is not necessary to form threads in the circular holes of the supporting sleeve itself. The circular holes can be in a simple manner be punched-out in the supporting sleeve. Further the bolts may have inner polygonal socket head or slotted head. The circular holes in the supporting tube can have approximately the same diameter as the screw heads, so that it is not necessary to maintain a large free space between the circular hole edges and the screw heads for the introduction of a bolt wrench and therefore the collection of large quantities of dirt in this free space with the supporting leg is eliminated.

DESCRIPTION OF THE PREFERRED EMBODIMENT

Figure 1:
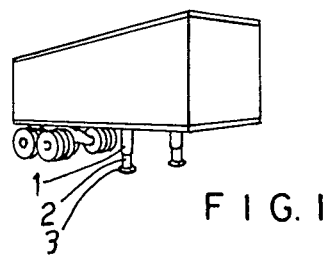
FIG. 1 is a perspective view of a trailer with the supporting device of the present invention.

The telescopic supporting device has a supporting leg 2 in an outer guiding tube 1. The supporting leg 2 may be extended and retracted by means of a crank mechanism not shown. At the lower end of the supporting leg 2, there is fastened in a detachable manner, an articulated foot, generally designated 3. The foot 3 is provided with a tubular sleeve 4 that is fitted into the lower opening of leg 2. Welded to the lower edge of the tubular sleeve 4 is a ground plate 5. In the lateral wall of leg 2 are diametral pierced circular holes 6 in each of which there is countersunk a head of bolts means 7 which head may be polygonal. The threaded part of each bolt 7 passes through circular hole 8 and is screwed into a nut 9 welded coaxially with the circular holes at the inner side of the tubular sleeve 4. The diameter of the holes 8 is smaller than the diameter of the holes 6, so that the underside of the heads of the bolts 7 abut the tubular sleeve 4.

The ground plate 5 loosely abuts the lower edge of the supporting leg 2 and extends radially outward as at 10 over the lower edge of the supporting leg 2. The foot 3 is further provided with a supporting plate generally designated 11 and a holding ring 12 obliquely overlaps edge section 13 of the ground plate 5 and is spaced from the supporting tube 2 to allow the swinging of the foot 3. The holding ring 12, the ground plate 5, the tubular sleeve 4 and the bolts 7 make, therefore, an articulated coupling between the supporting plate 11 and the supporting leg 2. In the space between the ground plate 5, the supporting plate 11 and the holding ring 12, there is an elastic pressure body 14 intended to cushion the foot 3. The pressure body 14 is shaped as a torroid and the circular rim 15 of plate 11 centers the torroid.

Figure 2:
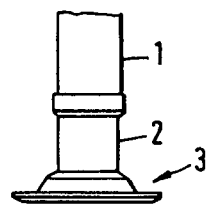
FIG. 2 shows a partial elevational view of a telescopic supporting device according to the invention for a trailer with the supporting leg partially extended, and, FIG. 3 shows an enlarged axial section of FIG. 2 with the supporting leg retracted.
Figure 3:
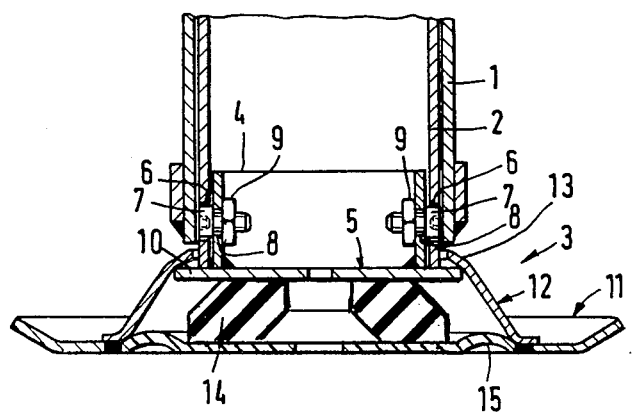

In the extended position of the supporting leg 2, according to the FIG. 1, the foot 3, after unscrewing the bolt 7, can be replaced when it should become necessary. The supporting leg 2 can be retracted so that the guiding tube 1 covers the bolts 7 and the holes 6 in such a manner that they are protected to a high degree against all dirt and against the penetration of road spray and rain water and thereby against corrosion, for the tube 1 almost abuts the holding ring. Simultaneously, the guiding tube acts in the position according to FIG. 2 as a lateral security for the bolts 7.

When the foot 3 is loaded by forces acting from the ground, the supporting plate forces are transmitted completely through the compression body 14 to the ground plate 5 resting on the lower edge of the supporting leg 2, without any load being placed on bolts 7. In the extended position of the supporting leg 2 the swinging mobility of the supporting plate 11 is limited only by the spacing between the holding ring 12 and the supporting leg 2, or through the compressibility of the compression body 14. In the retracted position of the supporting leg 2 up to the stop of the guiding tube on the holding ring, the guiding tube causes a closing of the cleft between the holding ring 12 and the supporting leg 2 to resist the penetration of dirt, spray or rain water in the hollow space of the foot.

We claim:

1. In a supporting device of a telescopic type having an extensible leg:
    a tubular sleeve fitted in the lower end of the leg, a ground plate fastened to the lower end of the sleeve, said plate jutting out sideways from the leg to define an edge section,
    a holding ring lying over the edge section,
    a supporting plate secured to the lower edge of the holding ring,
    an elastic compression body between the ground plate and the supporting plate,
    bolt means loosely securing the tubular sleeve to the leg, said bolt means passing through diametral holes in the sleeve, threaded nut means on the inner side of the sleeve receiving the bolt means, diametral holes in the supporting leg being larger than the diameter of the holes in the sleeve so that the bolt means may be received within the wall of the leg and the leg may be fully withdrawn into a telescopic guiding tube.

* * * * *